US006714515B1

(12) United States Patent
Marchand

(10) Patent No.: US 6,714,515 B1
(45) Date of Patent: Mar. 30, 2004

(54) POLICY SERVER AND ARCHITECTURE PROVIDING RADIO NETWORK RESOURCE ALLOCATION RULES

(75) Inventor: Laurent Marchand, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/572,689

(22) Filed: May 16, 2000

(51) Int. Cl.$^7$ .............................................. H04L 12/26
(52) U.S. Cl. .................... 370/231; 370/395.21; 709/226
(58) Field of Search ................ 370/229, 230, 370/230.1, 231, 232, 235, 395.2, 395.21; 709/226, 227, 229

(56) References Cited

U.S. PATENT DOCUMENTS

| 6,167,445 | A | * | 12/2000 | Gai et al. .................... 709/223 |
| 6,366,577 | B1 | * | 4/2002 | Donovan .................... 370/352 |
| 6,463,470 | B1 | * | 10/2002 | Mohaban et al. ........... 709/223 |
| 6,466,984 | B1 | * | 10/2002 | Naveh et al. ............... 709/228 |
| 6,594,277 | B1 | * | 7/2003 | Chiang et al. .............. 370/465 |
| 2001/0032262 | A1 | * | 10/2001 | Sundqvist et al. .......... 709/226 |

FOREIGN PATENT DOCUMENTS

| EP | 0 831 669 A | 3/1998 |
| EP | 1 098 490 A | 5/2001 |
| WO | WO 00 42805 A | 7/2000 |
| WO | WO 01 59986 A | 8/2001 |

OTHER PUBLICATIONS

Wen–Tsuen Chen et al: "RSVP mobility support: a signalling protocol for integrated services internet with mobile hosts" IEEE Infocom 2000, vol. 3, Mar. 26–30, 2000, pp. 1283–1292, XP002902041, Conference on Computer Communications. Nineteenth Annual Joint Conference of the IEEE Computer and Communications Societies, Proceedings IEEE Infocom 2000. Tel Aviv, Section I,III A & III B, the whole document.

S K Das et al: A resource reservation mechanism for mobile nodes in the internet: 1999 IEEE 49$^{th}$ Vehicular Technology Conferences, vol. 3, May 16–20, 1999, pp. 1940–1944, XP002902042. Moving into a new millenium, Houston, TX, USA, the whole document.

International Search Report, PCT/SE01/01086, dated Dec. 12, 2001.

* cited by examiner

Primary Examiner—Hassan Kizou
Assistant Examiner—D Levitan
(74) Attorney, Agent, or Firm—Jenkens & Gilchrist; Sandra Beauchesne

(57) ABSTRACT

A Radio Network Server (RNS) is modified to function as a policy server providing radio network resource allocation rules in an integrated third generation wireless IP network. The RNS determines a level of availability of radio network resources, and determines whether the level is sufficient to satisfy requests for resources in accordance with policy rules. The RNS informs a Bandwidth Broker (BB) whether the radio network resources are available. The BB functions as a Policy Decision Point (PDP) for its domain, and either allows or denies requests from users for network resources based on the input from the RNS. A plurality of edge routers in each domain interface with the BB utilizing the Common Open Policy Service (COPS) protocol interface. The edge routers function as Policy Enforcement Points (PEPs) for their domain to enforce policy decisions made by the BB. The BB may interface with BBs in other domains for calls that span multiple domains.

5 Claims, 2 Drawing Sheets

POLICY SERVER AND ARCHITECTURE PROVIDING RADIO NETWORK RESOURCE ALLOCATION RULES

BACKGROUND OF THE INVENTION

1. Technical Field of the Invention

This invention relates to telecommunication systems and, more particularly, to a policy server and architecture that provides radio network resource allocation rules in a real-time Internet Protocol (IP)-based telecommunications network.

2. Description of Related Art

As wireless networks evolve from primarily circuit-switched technology to IP-based packet-switched technology, networks with substantially more flexibility than current networks will bring new capabilities to consumers. However, converging Internet technology and wireless telecommunications technology is introducing new problems and new requirements on the wireless network. In circuit-switched networks, an application is assigned fixed-network resources (for example, a 64-kbit circuit) regardless of the amount of bandwidth actually required by that particular application. In many cases, the application may not fully utilize the allocated bandwidth, and network resources are wasted. Alternatively, if the application needs more bandwidth than the allocated amount, it may not be able to get it, and the application cannot request more bandwidth after it has started its execution.

As an example, a call may be placed from a mobile subscriber in Montreal to a mobile subscriber in Sweden. The circuit-switched call is routed from the cellular provider network in Montreal, through a domestic wireline provider, through an international provider, through one or more wireline providers in Europe, and finally to the Swedish mobile provider. Various gateways and switches contribute to establishing the end-to-end circuit-switched connection, which has to go through many different domains. Once the connection is established, there is no negotiation over bandwidth required for any particular application because the connection is fixed at 64 kbps. This is often a wasteful utilization of bandwidth capacity since a 64-kbps link is not required for a voice call; a voice call can be carried with excellent voice quality on a link operating, for example, at only 9.6 kbps.

The Application Performance Rating Table below further illustrates this problem by showing the amount of bandwidth required for different types of applications in order to achieve certain levels of Quality of Service (QoS). For example, if high quality video is carried over an ISDN link at 128 kbps, the end user sees jerky, robotic movement (fair). However, if the video is provided at 384 kbps, the quality of the video is much better. At the other end of the performance spectrum, a voice call can be carried at 9.6 kbps and still have excellent voice quality. For efficient use of network resources, a control mechanism is needed to ensure that the right amount of bandwidth is provided to deliver the requested QoS without wasting excess bandwidth.

Application Performance Rating Table

| Applications | Data Rates (kbps) | | | | | | |
|---|---|---|---|---|---|---|---|
| | 9.6 | 14.4 | 32 | 64 | 128 | 384 | 2000 |
| | Application Performance Rating | | | | | | |
| Voice, SMS | E | E | E | E | E | E | E |
| E-mail | P | F | E | E | E | E | E |
| Internet Web Access | P | P | F | F | E | E | E |
| Database Access | P | P | F | E | E | E | E |
| Synchronization | E | E | E | E | E | E | E |
| Document Transfer | P | P | F | E | E | E | E |
| Location Services | F | E | E | E | E | E | E |
| Still Image Transfer | P | F | E | E | E | E | E |
| Video Lower Quality | P | F | F | E | E | E | E |
| Video High Quality | P | P | P | F | F | E | E |

Excellent (E)
Fair (F)
Poor (P)

In packet-switched IP-based networks, the amount of assigned bandwidth is not fixed. An application can request specific network resources, and then renegotiate the allocated network resources during its lifetime. In an integrated network combining a fixed IP network with a radio access network, a major problem is how to provide this type of flexibility in the radio access portion of the network.

Another problem is that wireless access technologies such as "Enhanced Data for Global System for Mobile Communications (GSM) Evolution (EDGE)". Wideband Code Division Multiple Access (Wideband CDMA or WCDMA), CDMA 2000, Wireless Local Area Networks (WLAN), or Bluetooth wireless radio links are more subject to transmission errors than conventional fixed networks. Consequently, integration of the radio access portion with the more reliable fixed IP network is introducing new problems. For example, when using the Transmission Control Protocol (TCP) on a fixed IP network, lost packets due to transmission errors are retransmitted. Therefore, if someone in Australia is establishing a connection to a third generation (3G.IP) mobile terminal in North America using TCP, and some transmission errors occur on the radio link channel, TCP attempts to retransmit the data. The retransmission will occur from the originating point in Australia rather than locally between the base station and the mobile terminal. Therefore, an extra load is placed upon the entire network because of transmission problems in the radio portion.

An additional problem arises because the bandwidth over radio channels is typically more limited compared to the rest of the IP Access, EDGE, and core network. Therefore, some mechanisms are required in order to avoid unnecessarily carrying packets all the way from an origination point to a mobile terminal in a wireless network when the wireless network is not able to transport these packets to and from the mobile terminal. This is especially true when real-time applications such as Voice-over-IP (VoIP) are being utilized.

When a Voice-over-IP (VoIP) call is established across different domains in a packet-switched IP network, the parties involved in the call can change the bandwidth allocated to the call in the middle of the call. In other words, the characteristics of the bearer can be changed while the call is in progress. An example of the problem that this can present can be illustrated utilizing a scenario in which a real-time stream such as video is being sent from a mobile terminal in Montreal to a receiving mobile terminal in Sweden. During the call, the mobile subscriber receiving the transmission in Sweden requests that the sender increase the bandwidth, for example, to go from 8-bit color to 24-bit color to improve the accuracy of the received video. When the request is received in the sender's mobile terminal in Montreal, the terminal responds by increasing the bit rate to carry 24-bit color. The operators of the intermediate domains also increase the bandwidth allocation to the call to enable the additional data to be delivered. However, if radio resources in the receiver's radio access network in Sweden are totally occupied, the extra information cannot be delivered to the receiving mobile terminal, and is discarded. This is a highly inefficient use of system resources, and the carriers who provided the bandwidth to carry the information all the way from Montreal to the radio network in Sweden still want to be paid even though the information was discarded at the end.

There are no known prior art teachings of a solution to the aforementioned deficiencies and shortcomings. The Internet Engineering Task Force (IETF) has proposed a Policy Framework and Architecture for third generation (3G) wireless Internet Protocol (IP) networks and the Internet, the purpose of which is to establish the real-time network control that is necessary to transform the Internet from a "best efforts" data network to a more reliable, real-time network. There are two releases of the proposal for 3G systems, but neither of the releases addresses the issue of providing policy rules for the control of radio access network resources.

The first release, referred to as 3GPP Release 99, introduces some new radio access technology such as Wideband CDMA and EDGE. Wideband CDMA introduces not only a new radio technology, but also Asynchronous Transfer Mode (ATM) technology in the radio access portion of the network. In the Wideband CDMA radio network controller, two interfaces are supported. One is called Iu-cs which is circuit-switched toward the current circuit-switched network, and one is called Iu-ps which is packet-switched toward the General Packet Radio Service (GPRS) wireless IP network. All the real-time voice and data still goes through the circuit-switched network, and data goes through the best-efforts GPRS network. There is no integrated real-time network.

In the second 3G release called 3GPP Release 00, a real-time IP network is envisioned with all the infrastructure to carry real-time applications with equal or getter quality than circuit-switched networks. Policy rules are provided to a Bandwidth Broker (BB) regarding the resources of the fixed network, but not for the wireless access portion.

It would be advantageous, therefore, to have a network architecture that includes a policy server that provides radio network resource allocation rules to a BB. Additionally, the architecture would enable BBs to pass resource information to BBs in other domains thereby providing an indication of the end-to-end bandwidth capacity of a connection, including the radio access portion, to each BB involved in a connection. Thus, this solution would prevent the sending of data that cannot be carried through to the destination. The present invention provides a policy server and architecture that achieves these objectives.

SUMMARY OF THE INVENTION

In one aspect, the present invention is a policy server for providing radio network resource allocation rules to a Policy Decision Point (PDP) in a third generation (3G) wireless Internet Protocol (IP) network. The policy server includes means for determining a level of availability of radio network resources, an interface toward the PDP, and means for determining whether the level of availability of radio network resources is sufficient to satisfy the received requests for resources. The policy server receives queries from the PDP regarding the availability of radio network resources to satisfy requests for resources, and sends responses to the PDP indicating whether the requested resources are available.

In another aspect, the present invention is a Bandwidth Broker (BB) that functions as a PDP in a radio network access portion of an integrated IP network. The BB includes a user/application interface for receiving a call request from a user, or an inter-BB interface for receiving a request from another BB. The BB also includes means for determining radio network resources required to satisfy the received call request, a policy server interface toward a Radio Network Server (RNS), and an intra-domain interface toward an edge router for sending an approval or a denial for the requested resources. The BB sends queries to the RNS regarding the availability of radio network resources to satisfy the received call request, and receives responses from the RNS indicating whether the requested resources are available or allowed.

In yet another aspect, the present invention is a policy architecture for an integrated 3G wireless IP network having a radio access domain and an IP-based domain. The policy architecture includes a BB that functions as a PDP in each domain, a plurality of edge routers in each domain that interface with the BB and function as Policy Enforcement Points (PEPs), and a policy server that interfaces with the BB and provides radio network resource allocation rules to the BB.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention expands the role of a radio network server (for example, a radio network controller or base station controller) in an all-IP wireless network to act as a policy server toward a Bandwidth Broker (BB). The terms Bandwidth Broker, Network Control Point, and Bearer Manager are used interchangeably in the industry to refer to the same functional node, but Bandwidth Broker is currently preferred by the majority. As referred to herein, the BB does more than merely control bandwidth. Often, for example, an edge router will have the bandwidth available to carry a given application, but cannot carry the packets with the required latency to provide the desired QoS. Therefore, the BB instructs the edge router to deny access. This action is typically performed by having the BB install a policy in the edge router that denies the admission of the incoming flow. BBs do not exist today, but are proposed for the IETF policy framework architecture in order to support a real-time IP network.

Figure 1:
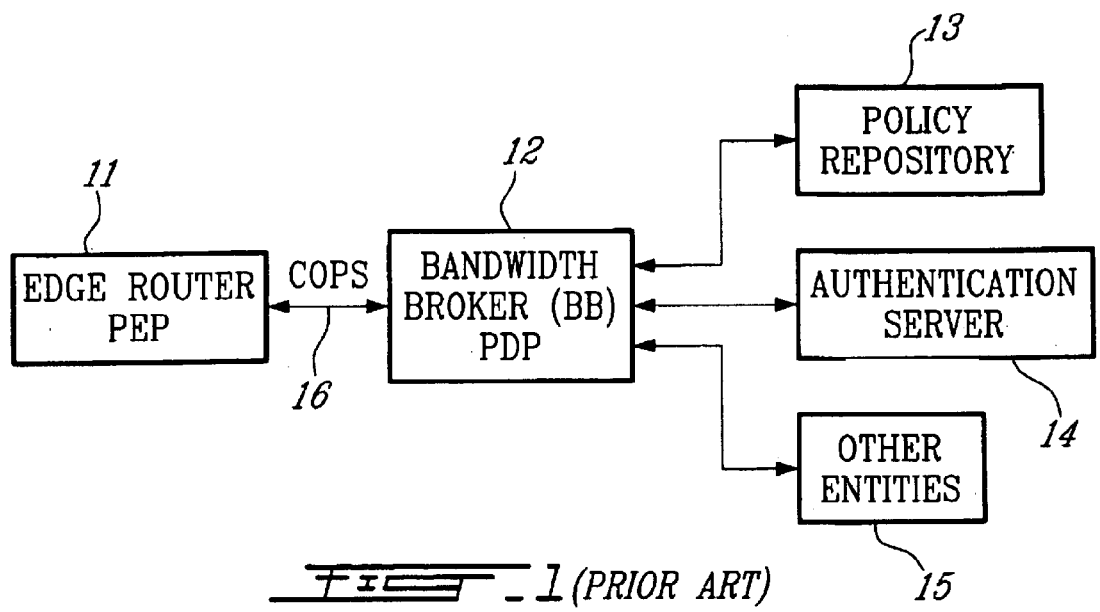
FIG. 1 (Prior Art) is a simplified functional block diagram of the Policy Framework and Architecture proposed by the IETF for fixed IP networks.

FIG. 1 is a simplified functional block diagram of the Policy Framework and Architecture proposed by the IETF for fixed IP networks. The RSVP Admission Policy (RAP) Working Group in IETF was originally chartered to establish a scalable policy control model for the Internet Reservation Protocol (RSVP). The policy framework they designed is also applicable to other QoS technologies such as Differential Services (DiffServ). The framework, in essence, is very simple since it identifies two primary components by their functionality: a Policy Enforcement Point (PEP) and a Policy Decision Point (PDP) which function, in a sense, as the "policeman" and the "judge", respectively.

In the IETF policy framework, each edge router 11 at the boundary of the IP network functions as a PEP. Edge routers control the flow of packets to and from a particular application, and their role in the policy framework can be likened to that of a policeman who is enforcing the rules. The BB 12 functions as a PDP, and its role can be likened to that of a judge. The BB decides whether particular requests for resource allocations within its domain can be satisfied, and then instructs the edge router to permit the application packet flow or not. In order to perform its function, the BB may consult a Policy Repository 13 which contains the network operator's rules for resource allocations. The Policy Repository may be implemented in a Lightweight Directory Access Protocol (LDAP) server. The BB also interfaces with an Authentication Server 14 and other entities 15. The BB may also interface with an IETF Authorization, Authentication, and Accounting (AAA) server through a policy server.

The PEP and the PDP are logical entities. They can be implemented on the same device or on separate devices. Typically, the PEP will be implemented within the context of an EDGE router at the boundary of a domain, while the PDP is implemented as a server node for the domain. There are likely to be many PEPs in a network domain; however, there is likely to be only one PDP (or two PDPs for network redundancy) and associated policy repositories for a particular domain.

Edge routers must understand both RSVP and DiffServ. RSVP and DiffServ are two related architectures in IETF. RSVP is basically a protocol built under the umbrella of integrated services. It interfaces existing routing protocols rather than performing its own routing, and is used by a host to request a specific QoS from the network. RSVP controls the flow of packets one flow at a time, independently of each other. RSVP controls QoS on a per-flow basis by attempting to make a resource reservation for an application data stream at each node through which it passes. RSVP communicates with two local decision modules: admission control and policy control to determine whether the node has sufficient resources to supply the QoS, and whether the user has administrative permission to make the reservation. RSVP is predominantly used within the access network.

DiffServ, on the other hand, is a mechanism where all flows that need to be treated alike are grouped in one approach. The IP header of each packet that comes into the core network is marked with the class of service the packet requires. The routers in the network treat all of the packets marked with each class of service in the same manner regardless of what flow they are in. DiffServ, therefore, is much more scalable than RSVP. It is mainly used in the multi-service backbone.

Edge routers, therefore, must understand both RSVP and DiffServ. The edge router 11 communicates with the BB 12 over a Common Open Policy Service (COPS) protocol interface 16, and COPS, therefore, is designed to interwork with both RSVP and DiffServ. The COPS standard defines the roles between the BB that implements the PDP and the edge routers that implement the PEPs. Thus, when it is desired to implement a real-time system, the edge routers must support COPS.

Since there are varying circumstances in which traffic owners (end users, applications, etc.) are entitled to the services they request and are probably paying for, there is a need for rules, a need for "police" to enforce these rules, and a need for "judges" to decide when the rules apply. The rules, the police, and the judges all comprise a policy system that is an essential component of a QoS-enabled IP network, and the policy system must integrate the radio access network in its policy implementation.

In the present invention, the Radio Network Server (RNS) is modified to behave as a policy server toward the BB. The RNS controls radio resources and allocates radio resources to users. In order to accomplish this objective, the present invention (1) adds the RNS to the RAP Policy Framework and Architecture, (2) adds a new interface between the BB and the RNS, (3) adds functionality in the BB to support the new interface, and (4) adds functionality in the RNS to support the new interface.

Figure 2:
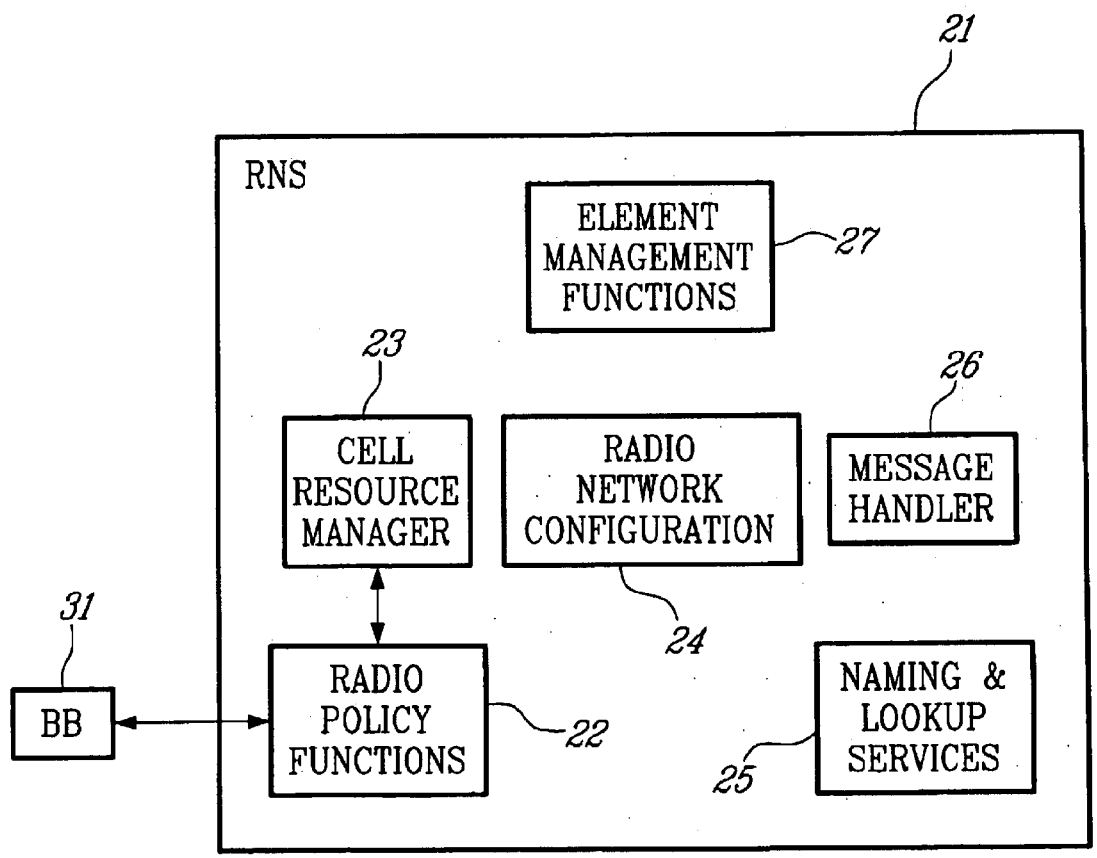
FIG. 2 is a simplified functional block diagram of the Radio Network Server (RNS) of the present invention, illustrating the modifications enabling it to interact with a Bandwidth Broker (BB)
Figure 3:
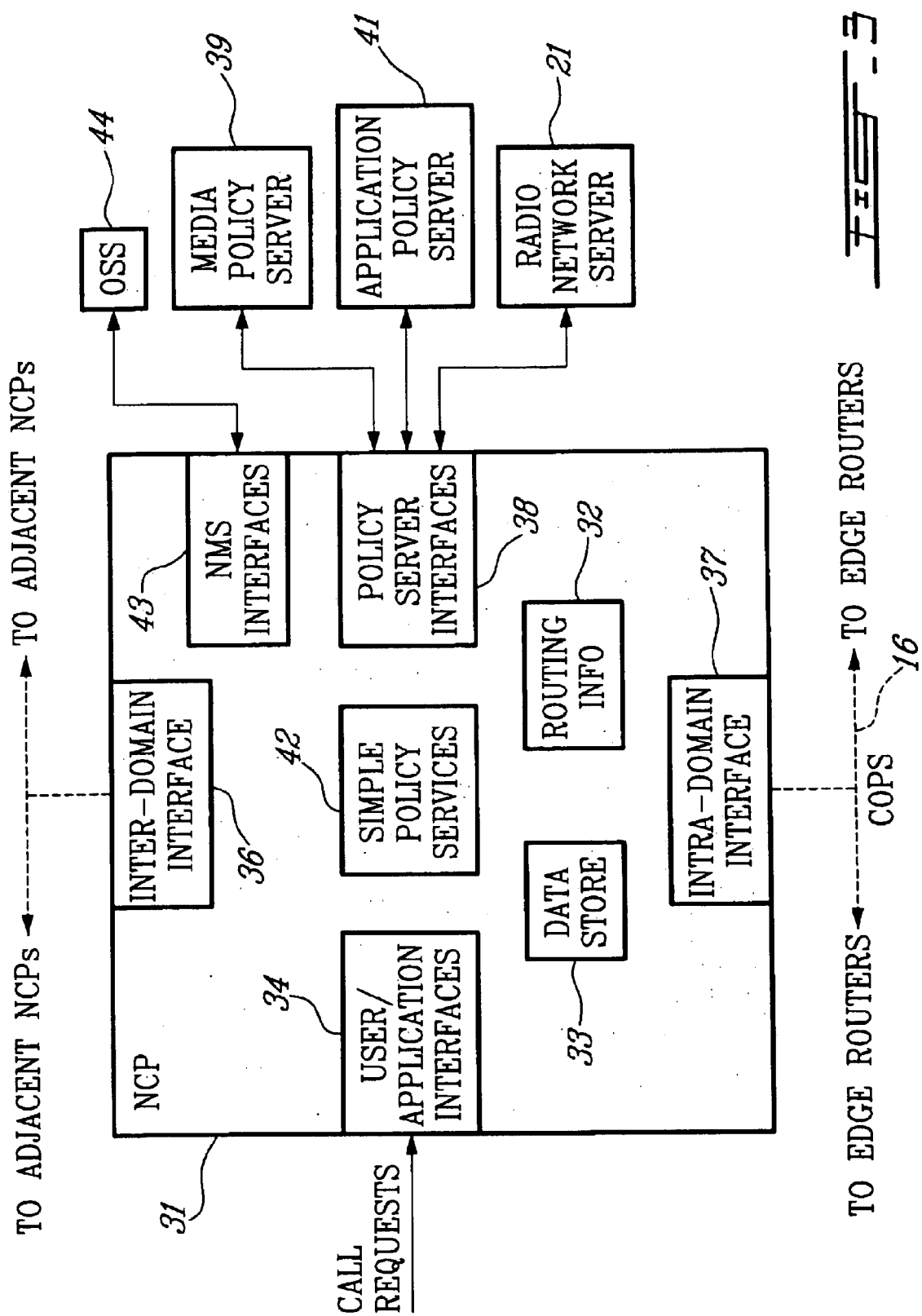
FIG. 3 is a simplified functional block diagram of a BB that has been modified in accordance with the teachings of the present invention to support a policy server interface with the RNS and an interface with other BBs.

FIG. 2 is a simplified functional block diagram of the RNS 21 of the present invention, illustrating the modifications enabling it to interact with the modified BB 31 (FIG. 3). The RNS is a new entity that keeps track of what radio resources are available, and instructs the BB whether to admit a new application that may be blocked due to congestion in the radio access network. The interface with the BB occurs through a Radio Policy Functions block 22. The Radio Policy Functions block interacts with a Cell Resource Manager 23 which contains traffic, radio network, and channel allocation functions. A Radio Network Configuration database 24 supplies configuration information to the Cell Resource Manager, enabling it to determine available radio resources, control the radio resources, and allocate the radio resources to users. The RNS 21 also includes Naming and Lookup Services 25, a Message Handler 26, and a block to control internal Element Management Functions 27.

FIG. 3 is a simplified functional block diagram of a BB 31 that has been modified in accordance with the teachings of the present invention to support the policy server interface with the RNS 21. The BB is a server application. The BB understands all IP protocols such as the Routing Information Protocol (RIP) 32. Therefore, it builds a database 33 that allows the router to understand the topology of the network it controls. It knows what paths in the network, by default, packets will use in crossing the network. It knows what nodes need to be controlled in order to ensure all of an application's packets flow through the network in such a way that they fulfill the appropriate Service Level Agreement (SLA).

Requests to set up a call may come from a user or another BB, and enter the BB through a set of User/Application Interfaces 34. The call request includes a destination IP address and a desired class of service, and specifies whether QoS is required in the send, receive, or both directions, whether QoS is enabled or assured, and the type of application. The User/Application Interface maps the type of application and class of service to an SLA. The SLA specifies the characteristics that are needed to carry the packets that belong to a specific application such as the amount of bandwidth, delays, delay variation, and jitter. The User/Application Interfaces block translates the SLA to to a Service Level Specification (SLS). The system must then enforce the SLS to ensure that the right QoS is provided end-to-end.

When QoS is assured, the call is completed only after all of the network resources required for a specified QoS are assured. Therefore, the called number will not ring unless the quality of the call is assured. When QoS is enabled, the call is allowed even when partial or no QoS is available. The caller may receive a notification that the quality of the call cannot be guaranteed, and may ask if the caller would like to proceed.

An Inter-Domain Interface 36 enables the BB to communicate with BBs in adjacent domains. There is one BB per domain, and when a call is placed that spans several domains, such as the earlier exemplary call from Montreal to Sweden, the BB in each domain requests the following BB whether it can admit the packets with the requested bandwidth, latency, etc. An Intra-Domain Interface 37 is utilized to communicate with the edge routers within the BB's own domain using the COPS interface 16.

Before talking to the edge routers, the BB must first verify that the policy allows for these packets to be admitted. A set of Policy Server Interfaces 38 links the BB to different types of policy servers. One type is a Media Policy Server (MPS) 39 through which the system operator provides instructions on how the bandwidth in the network should be allocated. For example, the IETF has standardized four classes of services: Best Efforts, Interactive, Real-time Stream, and Conversational, and the operator may instruct that 25% of the available bandwidth be reserved for Best Efforts and Interactive traffic. Another type of policy server is an Application Policy Server (APS) 41 which relates to the application and subscriber profile, and determines who can use each type of bearer in terms of quality, and so on. The operator may decide, for example, that a certain type of subscriber cannot request a bit pipe with a conversational class of service because once the bit pipe is established, the subscriber will use his own call server to place voice calls over the network without the operator's knowledge. Therefore, the operator may establish policies in the APS that enable him to keep better control of the network. A third type of policy server in the present invention is the RNS 21 which, as noted above, controls radio resources and allocates radio resources to users.

The BB may also include an internal policy server for defining simple rules, identified in FIG. 3 as Simple Policy Services 42. The simple rules may be similar to the bandwidth allocation rules handled by the MPS 39, when such simple rules can be handled internally in the BB. Finally, a Network Management Interfaces block 43 provides Element Management Functions for the BB. This block provides a machine-machine interface to the Operating Support System (OSS) 44 which performs management tasks such as start, restart, configure, optimize performance, upgrades, etc.

When an application or a BB from another domain is making a request to the BB of a wireless access domain for the establishment or changes in the Service Level Specifications (bandwidth, jitters, delay), the BB interacts with the RNS through the new interface. Since the main role of the RNS is to control and manage the radio network configuration, the RNS is consequently aware of the availability of radio resources. Therefore, the RNS can act as a policy server and set the conditions for actions by the BB. For example, if radio resources are available, the RNS may notify the BB that it can attempt to establish an SLA within or across the domains between the two end points.

The functionality of the BB is augmented to enable it to map a requested Class of Service and a specific type of application to a specific SLA. However, it is not sufficient to request a "bit pipe" with a specific Class of Service. The amount of bandwidth for a voice call with Class of Service "Conversational" and a video call with Class of Service "Conversational" is very different. Consequently, it is required to map a combination of both: Class of Service and Type of Applications to an SLA.

When the present invention is implemented and utilized in the earlier scenario in which the mobile subscriber in Montreal is calling the mobile subscriber in Sweden, and the receiving subscriber in Sweden wants to increase the bandwidth, the request goes through a call server. The call server queries the BB for the Swedish mobile network whether the bandwidth is available. The BB utilizes input from the policy server to make the decision. The RNS in Sweden, acting as the policy server, tells the BB that the resources are not available. Therefore, the BB denies the request for increased bandwidth. A message is then sent through the BBs in each domain to the BB in the mobile network in Montreal which instructs the mobile terminal not to send the additional data.

It is thus believed that the operation and construction of the present invention will be apparent from the foregoing description. While the policy server, broker, and architecture shown and described has been characterized as being preferred, it will be readily apparent that various changes and modifications could be made therein without departing from the scope of the invention as defined in the following claims.

What is claimed is:

1. A Bandwidth Broker (BB) that functions as a Policy Decision Point (PDP) in a radio network access portion of an integrated Internet Protocol (IP) network, said BB comprising:
   a user/application interface for receiving a call request;
   means for determining radio network resources required to satisfy the received call request;
   a first policy server interface toward a Radio Network Server (RNS) for sending queries from the BB regarding the availability of radio network resources to satisfy the received call request, and for receiving responses from the RNS indicating whether the requested resources are available;
   an intra-domain interface toward an edge router for sending an approval or a denial for the requested resources;
   an intra-domain interface toward a BB in another network domain for sending an indication of whether or not the request for resources can be satisfied; and
   a second policy server interface toward a Media Policy Server (MPS) for retrieving from the MPS, system operator instructions regarding how resources in the network should be allocated.

2. The BB of claim 1 further comprising a third policy server interface toward an Application Policy Server (APS) for retrieving from the APS, system operator instructions regarding which particular applications or subscribers can use each type of bearer.

3. A policy architecture for an integrated third generation (3G) wireless Internet Protocol (IP) network having a radio raccess domain and an IP-based domain, said policy architecture comprising:
   a Bandwidth Broker (BB) that functions as a Policiy Decision Point (PDP) in each domain;
   a plurality of edge routers in each domain that interface with the BB and function as Policy Enforcement Points (PEPs);

a policy server that interfaces with the BB and provides radio network resource allocation rules to the BB; and wherein the BB includes:
- a user/application interface for receiving a call request from a user;
- means for determining radio network resources required to satisfy the received call request;
- a policy server interface toward the policy server for sending queries from the BB regarding the availability of radio network resources to satisfy the received call request, and for receiving responses from the policy server indicating whether the requested resources are available; and
- an intra-domain interface toward an edge router for sending an approval or a denial for the requested resources.

4. The policy architecture of claim 3 wherein an Internet Reservation Protocol (RSVP) is utilized within an access domain in the integrated network, and a Differentiated Services (DiffServ) is utilized in a multi-service backbone domain, and the edge routers interface with the BB utilizing a Common Open Policy Service (COPS) protocol interface which interworks with both RSVP and DiffServ.

5. A policy architecture for an integrated third generation (3G) wireless Internet Protocol (IP) network having a radio raccess domain and an IP-based domain, said policy architecture comprising:

- a Bandwidth Broker (BB) that functions as a Policiy Decision Point (PDP) in each domain;
- a plurality of edge routers in each domain that interface with the BB and function as Policy Enforcement Points (PEPs); and
- a policy server that interfaces with the BB and provides radio network resource allocation rules to the BB, the policy server including:
  - means for determining a level of availability of radio network resources;
  - an interface toward the BB for receiving queries from the BB regardin the availability of radio network resources to satisfy requests for resources, and for sending responses to the BB indicating whether the requested resources are available; and
  - means for determining whether the level of availability of radio network resources is sufficient to satisfy the received requests for resources.

* * * * *